US012613653B2

(12) United States Patent
Shikata et al.

(10) Patent No.: US 12,613,653 B2
(45) Date of Patent: Apr. 28, 2026

(54) LOW PASS THROUGH VOLTAGE ON LOWER TIER WORDLINES FOR READ DISTURB IMPROVEMENT

(71) Applicant: Micron Technology, Inc., Boise, ID (US)

(72) Inventors: Go Shikata, San Jose, CA (US); Xiangyu Yang, San Jose, CA (US); Ching-Huang Lu, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 166 days.

(21) Appl. No.: 18/412,010

(22) Filed: Jan. 12, 2024

(65) Prior Publication Data

US 2024/0248637 A1      Jul. 25, 2024

Related U.S. Application Data

(60) Provisional application No. 63/481,068, filed on Jan. 23, 2023.

(51) Int. Cl.
G06F 3/06 (2006.01)

(52) U.S. Cl.
CPC .......... G06F 3/0655 (2013.01); G06F 3/0604 (2013.01); G06F 3/0679 (2013.01)

(58) Field of Classification Search
CPC ..... G06F 3/0604; G06F 3/0655; G06F 3/0679
USPC ...................................................... 365/185.22
See application file for complete search history.

(56) References Cited

U.S. PATENT DOCUMENTS

| | | | | |
|---|---|---|---|---|
| 10,971,231 B1 * | 4/2021 | Gautam | ................. | G11C 16/10 |
| 2016/0019971 A1 * | 1/2016 | Horii | ................... | G11C 11/5642 |
| | | | | 365/185.17 |
| 2017/0084341 A1 * | 3/2017 | Lee | ........................ | G11C 16/08 |
| 2022/0076761 A1 * | 3/2022 | Lee | ........................ | G11C 7/04 |
| 2022/0366989 A1 * | 11/2022 | Lee | ........................ | G11C 16/26 |
| 2023/0018605 A1 * | 1/2023 | Kim | ........................ | G11C 16/32 |
| 2023/0058213 A1 * | 2/2023 | Seo | ........................ | G11C 16/10 |
| 2023/0178160 A1 * | 6/2023 | Liu | ....................... | G11C 29/022 |
| | | | | 365/185.09 |
| 2023/0307018 A1 * | 9/2023 | Kataoka | .............. | G11C 11/5671 |
| 2024/0192857 A1 * | 6/2024 | Min | ....................... | G06F 3/0659 |

* cited by examiner

*Primary Examiner* — Ly D Pham
(74) *Attorney, Agent, or Firm* — Lowenstein Sandler LLP

(57) ABSTRACT

A memory device can include a memory array coupled with control logic. The control logic initiates a read operation on one or more memory cells of a plurality of memory cells arranged in one or more tiers. The control logic can further cause a read voltage to be applied to a selected wordline coupled to the one or more memory cells during the read operation. The control logic can cause a first voltage to be applied to a first set of unselected wordlines coupled to memory cells in a first tier of the one or more tiers during the read operation. The control logic can cause a second voltage to be applied to a second set of unselected wordlines coupled to memory cells in a second tier of the one or more tiers during the read operation, wherein the second voltage is less than the first voltage.

17 Claims, 10 Drawing Sheets

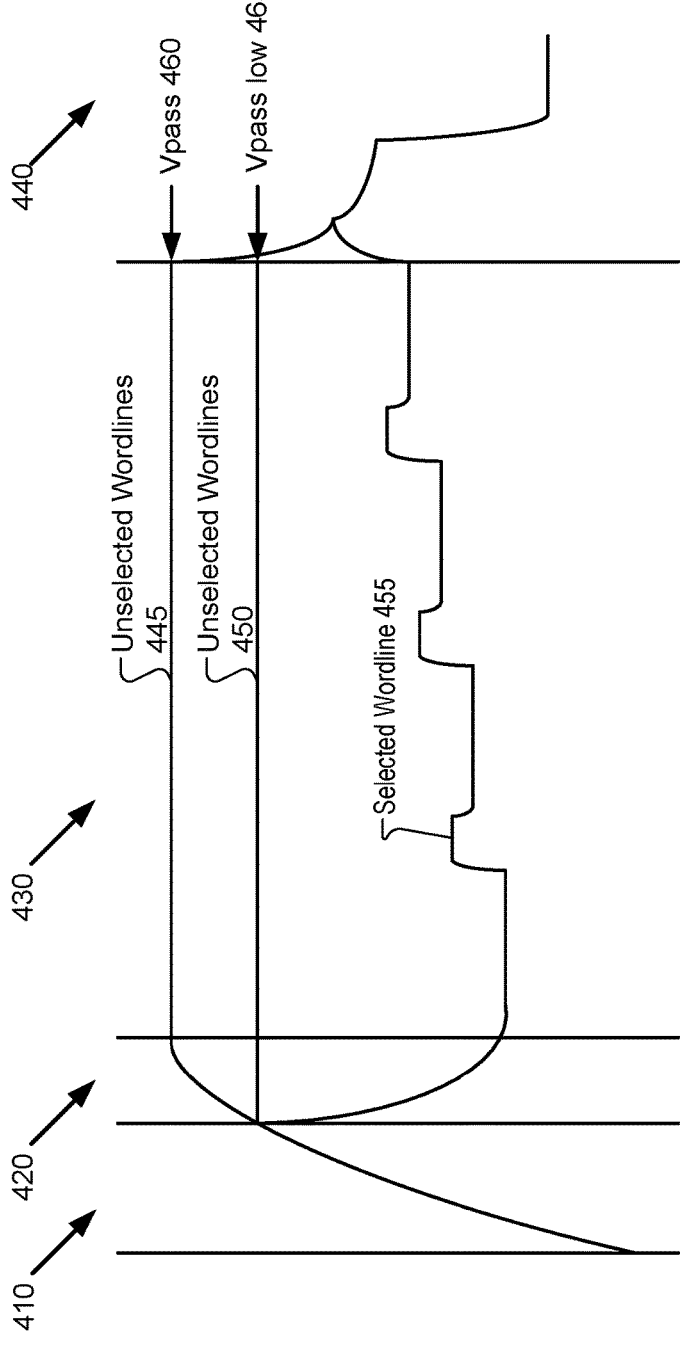
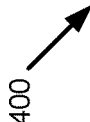
FIG. 4

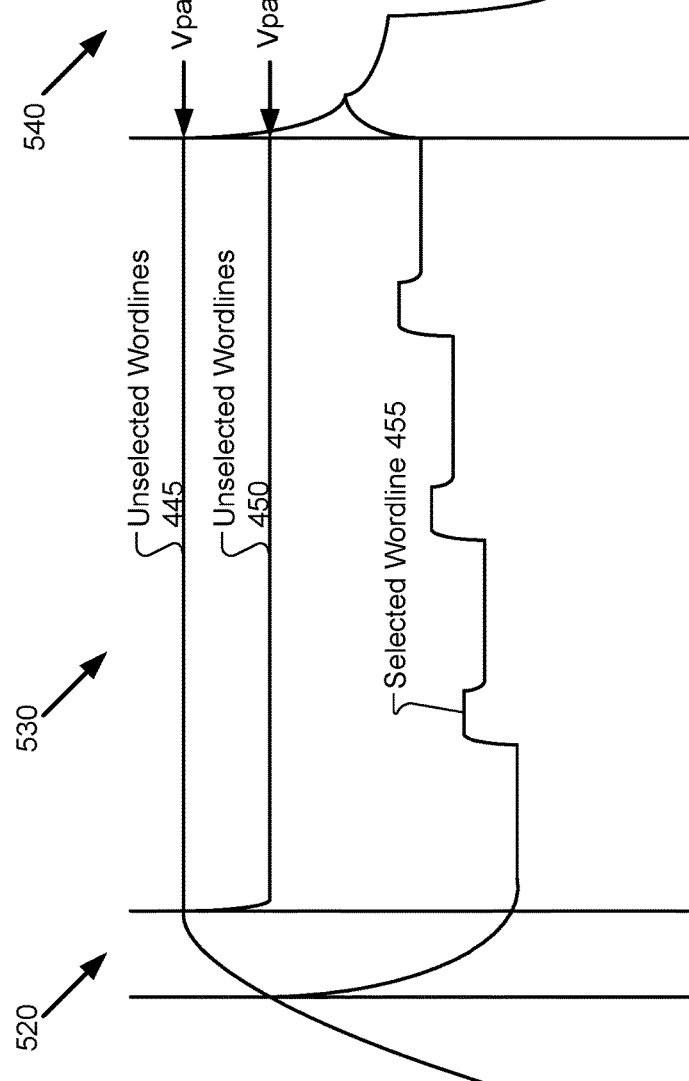
FIG. 5

Figure 7:
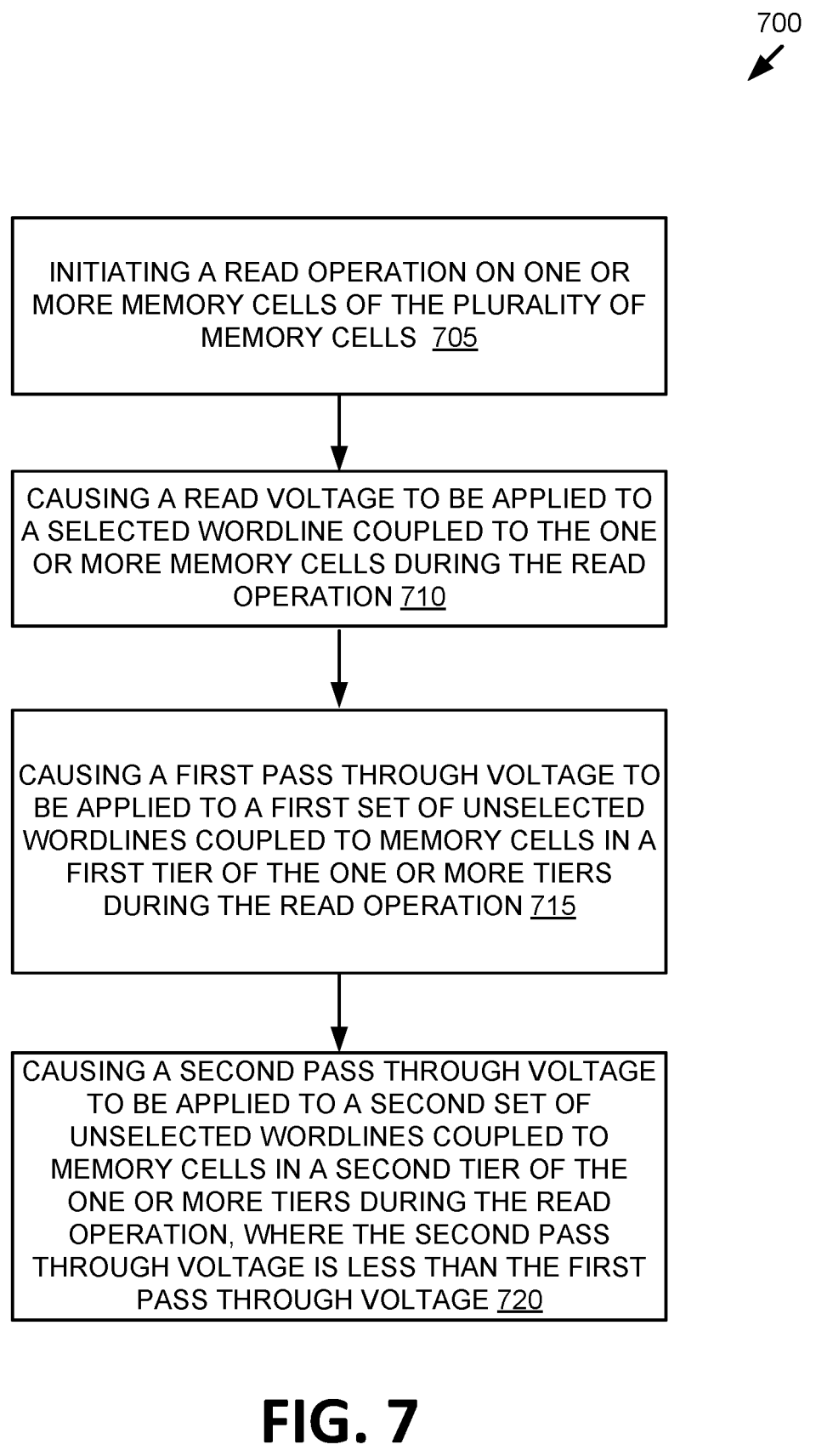

700

INITIATING A READ OPERATION ON ONE OR MORE MEMORY CELLS OF THE PLURALITY OF MEMORY CELLS 705

CAUSING A READ VOLTAGE TO BE APPLIED TO A SELECTED WORDLINE COUPLED TO THE ONE OR MORE MEMORY CELLS DURING THE READ OPERATION 710

CAUSING A FIRST PASS THROUGH VOLTAGE TO BE APPLIED TO A FIRST SET OF UNSELECTED WORDLINES COUPLED TO MEMORY CELLS IN A FIRST TIER OF THE ONE OR MORE TIERS DURING THE READ OPERATION 715

CAUSING A SECOND PASS THROUGH VOLTAGE TO BE APPLIED TO A SECOND SET OF UNSELECTED WORDLINES COUPLED TO MEMORY CELLS IN A SECOND TIER OF THE ONE OR MORE TIERS DURING THE READ OPERATION, WHERE THE SECOND PASS THROUGH VOLTAGE IS LESS THAN THE FIRST PASS THROUGH VOLTAGE 720

INITIATING A READ OPERATION ON ONE OR MORE MEMORY CELLS OF THE PLURALITY OF MEMORY CELLS  805

CAUSING A READ VOLTAGE TO BE APPLIED TO A SELECTED WORDLINE COUPLED TO THE ONE OR MORE MEMORY CELLS DURING THE READ OPERATION 810

CAUSING A FIRST PASS THROUGH VOLTAGE TO BE APPLIED TO A FIRST SET OF UNSELECTED WORDLINES COUPLED TO MEMORY CELLS IN A FIRST TIER OF THE ONE OR MORE TIERS DURING THE READ OPERATION 815

CAUSING A SECOND SET OF UNSELECTED WORDLINES COUPLED TO MEMORY CELLS IN A SECOND TIER OF THE ONE OR MORE TIERS TO BE BIASED TO A SECOND PASS THROUGH VOLTAGE DURING THE READ OPERATION, WHERE THE SECOND PASS THROUGH VOLTAGE IS LESS THAN THE FIRST PASS THROUGH  VOLTAGE 820

FIG. 8

LOW PASS THROUGH VOLTAGE ON LOWER TIER WORDLINES FOR READ DISTURB IMPROVEMENT

RELATED APPLICATIONS

This application claims the benefit of U.S. Provisional Patent Application No. 63/481,068, filed Jan. 23, 2023, the entire contents of which are hereby incorporated by reference herein.

TECHNICAL FIELD

Embodiments of the disclosure relate generally to memory sub-systems, and more specifically, relate to a utilizing a low pass through voltage on lower tier wordlines in a memory device of a memory sub-system to improve read disturb.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a timing diagram for operation of a memory device during a read operation utilizing a low pass through voltage, in accordance with embodiments of the present disclosure.

FIG. 5 is a timing diagram for operation of a memory device during a read operation utilizing a low pass through voltage, in accordance with embodiments of the present disclosure.

FIG. 7 is a flow diagram of an example method of using a low pass through voltage on lower tier wordlines for read disturb improvement FIG. 8 is a flow diagram of an example method of using a low pass through voltage on lower tier wordlines for read disturb improvement.

DETAILED DESCRIPTION

Figure 1A:
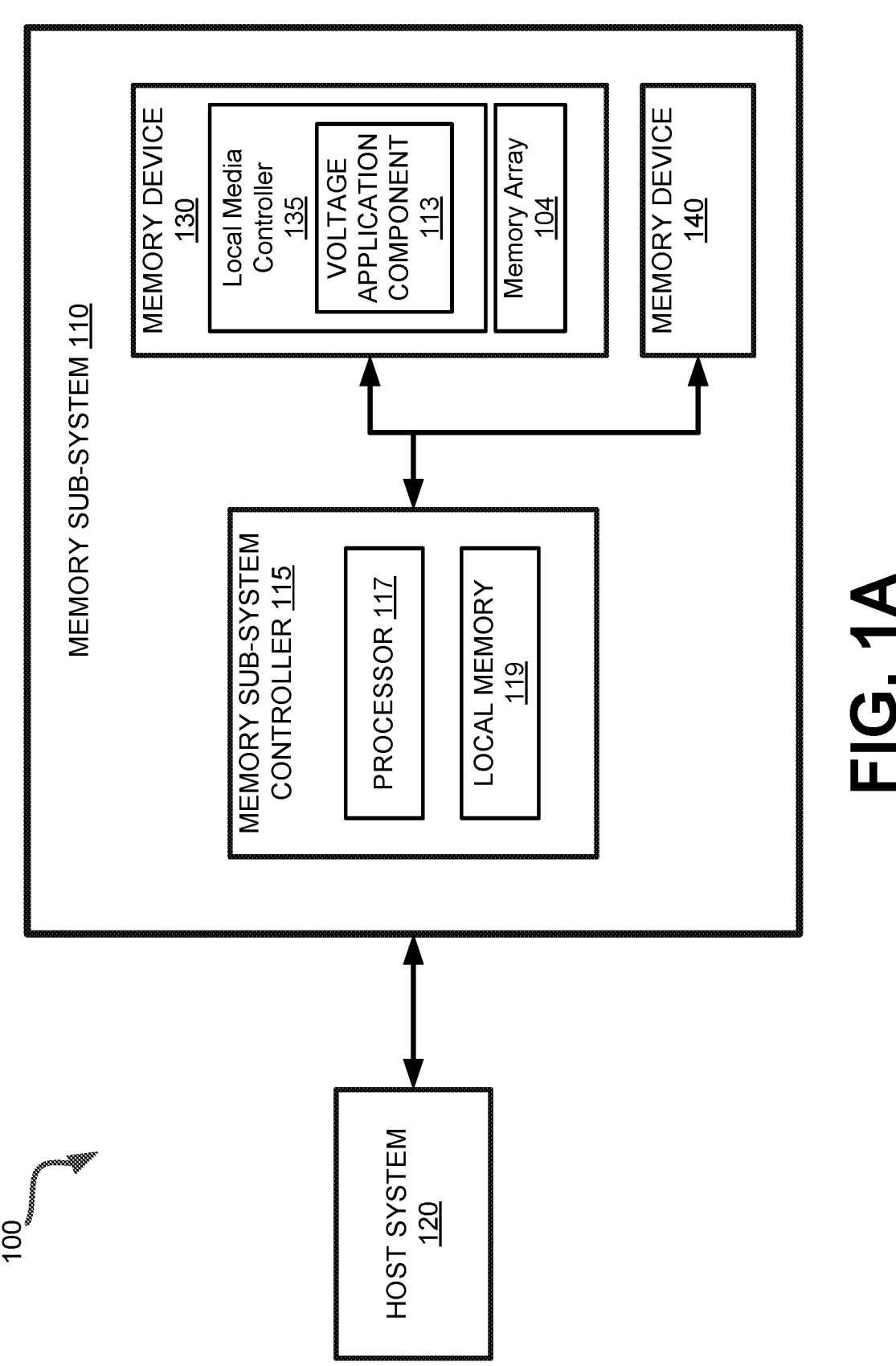
FIG. 1A illustrates an example computing system that includes a memory sub-system in accordance with some embodiments of the present disclosure.

Aspects of the present disclosure are directed to using a low pass through voltage on lower tier wordlines in a memory device. For example, aspects of the present disclosure are directed to applying a lower pass through voltage to unselected wordlines that are located towards a bottom of a pillar as described herein. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bit lines) and rows (also hereinafter referred to as wordlines). A wordline can refer to one or more rows of memory cells of a memory device that are used with one or more bit lines to generate the address of each of the memory cells. The intersection of a bit line and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. Each data block can include a number of sub-blocks, where each sub-block is defined by an associated pillar (e.g., a vertical conductive trace) extending from a shared bit line. Memory pages (also referred to herein as "pages") store one or more bits of binary data corresponding to data received from the host system. To achieve high density, a string of memory cells in a non-volatile memory device can be constructed to include a number of memory cells at least partially surrounding a pillar of channel material. The memory cells can be coupled to access lines, which are commonly referred to as "wordlines," often fabricated in common with the memory cells, so as to form an array of strings in a block of memory. The compact nature of certain non-volatile memory devices, such as 3D flash NAND memory, means wordlines are common to many memory cells within a block of memory.

During a program operation or an erase operation on a non-volatile memory device, a selected memory cell(s) can be programmed or erased with the application of a voltage to a selected wordline. Due to the wordline being common to multiple memory cells, unselected memory cells can be subject to the same programming voltage as the selected memory cell(s). If not otherwise preconditioned, the unselected memory cells can experience effects from the programming voltage on the common wordline. The programming voltage effects can include the condition of charge being stored in the unselected memory cells which are expected to maintain stored data. This programming voltage effect is termed a "programming disturbance" or "program disturb" effect. Although memory cells undergoing program disturb are still apparently readable, the contents of the memory cell can be read as a data value different than the intended data value stored before application of the programming voltage.

During a read operation on a non-volatile memory device, a selected memory cell(s) can be read with the application of a voltage to a selected wordline. Due to the wordline being common to multiple memory cells, unselected memory cells can be subject to the read voltage applied to the selected memory cell(s). For example, the read voltage can cause a disturbance on unselected memory cells in a same row or block during the read operation. In such examples, the effect of the read operation causing impacts on threshold voltages of unselected memory cells is termed "read disturb"—e.g., read disturb can cause threshold voltages of the unselected memory cells to shift and cause errors when the unselected memory cells are subsequently read.

Conventional solutions can attempt to mitigate the read disturb effect by applying a single pass through voltage (e.g., Vpass) to all unselected wordlines during the read operation. The pass through voltage can represent an upper boundary of a memory cell's threshold voltage—e.g., the pass through voltage can be a voltage that guarantees a memory cell is switched "on" when applied. Applying the pass through voltage on unselected wordlines coupled to memory cells excluded from the read operation (e.g., memory cells unselected for the read operation) can enable the memory device to determine the states of the selected memory cells. However, using the single pass through voltage can fail to adequately mitigate the read disturb effect. For example, 3D NAND (e.g., replacement gate memory cells) can be formed in a manner that causes memory cells to have different characteristics. Memory cells formed at a top of a pillar (e.g., in a higher tier) can have a larger cell critical dimension (e.g., a minimum line width of the cell) than memory cells formed at a bottom of a pillar—e.g., memory cells at the top of the pillar can be wider and larger than memory cells formed at the bottom of the pillar as described with reference to FIG. 3. In examples, the memory cells formed at the bottom of the pillar can have more dielectric variations and be more sensitive to read disturb—e.g., more susceptible to a shift in their threshold voltage as a result of a read operation. Accordingly, applying the same pass through voltage on the memory cells at the top and the memory cells at the bottom of the pillar can fail to reduce read disturb. That is, cell reliability after a read cycle stress can be affected by memory cells having the worst read disturb or read window budget (RWB). By failing to mitigate the read disturb effecting the memory cells at the bottom of the pillar, the overall read reliability can be reduced.

Aspects of the present disclosure address the above and other deficiencies by segmenting unselected wordlines into groups, where each group is biased to a different pass through voltage during a read operation. The unselected wordlines can be segmented into groups based on cell characteristics—e.g., based on a critical dimension, a read disturb, or a read window budget. In some examples, the cell characteristics can be determined during a test operation or be determined during a manufacturing process. A processing device of the memory device can store the information indicating the groups or wordlines and a respective bias to apply to each unselected wordline group during the read operation—e.g., the testing operation or manufacturing process can also determine a bias to apply to each unselected wordline group during the read operation.

In one embodiment, the processing device can determine some number of sets, such as two (2) sets (e.g., groups) for example, of unselected wordlines, high tier unselected wordlines and lower tier unselected wordlines—e.g., unselected wordlines coupled with memory cells at the top of the pillar and unselected wordlines coupled with memory cells at the bottom of the pillar. The processing device can cause a first voltage to be applied to the first set of unselected wordlines and a second voltage to be applied to the second set of unselected wordlines, where the second voltage is less than the first voltage—e.g., the processing device can apply a lower pass through voltage to the unselected memory cells at the bottom of the pillar. In some examples, a first voltage source can apply the first voltage and a second voltage source can apply the second voltage. In some examples, the processing device can utilize a voltage source that applies a bias to dummy wordlines (e.g., to wordlines coupled to memory cells storing invalid data or data not associate with a host system) to apply the second voltage to the second set of unselected wordlines.

In some embodiments, the processing device can cause the first voltage from the first voltage source to be applied to all of the unselected wordlines during the read operation. In such examples, the processing device can determine when the second set of unselected wordlines is biased to the first voltage and selectively discharge the second set of unselected wordlines to the second voltage—e.g., the processing device can bias all unselected wordlines to the first voltage and then discharge the second set of unselected wordlines until they are biased to the reduced second voltage.

In other embodiments, the processing device can cause the first voltage to bias the first set of unselected wordlines and the second set of unselected wordlines. The processing device can determine when the second set of wordlines are biased to the second voltage and isolate the second set of unselected wordlines from the voltage source accordingly—e.g., isolate the second set of unselected wordlines when the second set of unselected wordlines is biased to the second voltage. In some examples, isolating the second set of unselected wordlines from the voltage source can cause the second of unselected wordlines to be in a "floating state." After isolating the second set of unselected wordlines, the processing device can continue applying the first voltage to the first set of unselected wordlines until the first set of unselected are biased to the first voltage. It should be noted that two groups of unselected wordlines are used as an example only. There can be any number of unselected wordline groups, each with a different pass through voltage.

By utilizing the different pass through (e.g., Vpass) voltages for unselected wordlines during the read operation, the overall read disturb can be improved—e.g., applying a lower pass through voltage to memory cells in the lower tier or at the bottom of the pillar can reduce read disturb. With reduced read disturb, the overall cell reliability and read window budget of the system can be improved.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller

115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, local media controller 135 can include a voltage application component 113. In at least one embodiment, the voltage application component 113 is configured to store information indicating groups of unselected wordlines and a respective pass through voltage to apply during a read operation. In some examples, the unselected wordlines can be grouped based on cell characteristics determined during a test operation or manufacturing process—e.g., grouped based on a read disturb, read window budget (RWB), a cell critical dimension (e.g., a minimum line width of the memory cell). The unselected wordline bias can also be determined during the testing or manufacturing process. In at least one embodiment, the voltage application component 113 is configured to cause a respective pass through voltage bias to be applied to each group or set of unselected wordlines during the read operation. For example, the voltage application component 113 can cause a first voltage to be applied to a first set of unselected wordlines and a second voltage to be applied to a second set of unselected wordlines. In such examples, the second voltage is less than the first voltage and the first set of wordlines are positioned above the second set of unselected wordlines in a vertical direction. In other embodiments, the voltage application component 113 can be configured to cause the first set of unselected wordlines to be biased to a first voltage and the second set of unselected wordlines to be biased to the second voltage. For example, the voltage application component 113 can cause a voltage to be applied to all unselected wordlines and cause all of the unselected wordlines to be biased to the first voltage. The voltage application component 113 can then cause the second set of unselected wordlines to be selectively discharged to the second voltage. In other examples, the voltage application component 113 can cause all of the unselected wordlines to be biased to the second voltage and cause the second set of unselected wordlines to be isolated—e.g., determine when the second set of unselected wordlines are biased to the second voltage and isolate them accordingly. In such embodiments, the voltage application component 113 can then proceed with causing the first set of unselected wordlines to be biased to the first voltage while the second set of unselected wordlines remain in a floating state and at the second voltage.

In some embodiments, the memory sub-system controller 115 includes at least a portion of voltage application component 113. In some embodiments, voltage application component 113 is part of the host system 120, an application, or an operating system. In such an embodiment, voltage application component 113 can be implemented using hardware or as firmware, stored on memory device 130, executed by the control logic (e.g., voltage application component 113) to perform the operations related to read operations described herein.

Figure 1B:
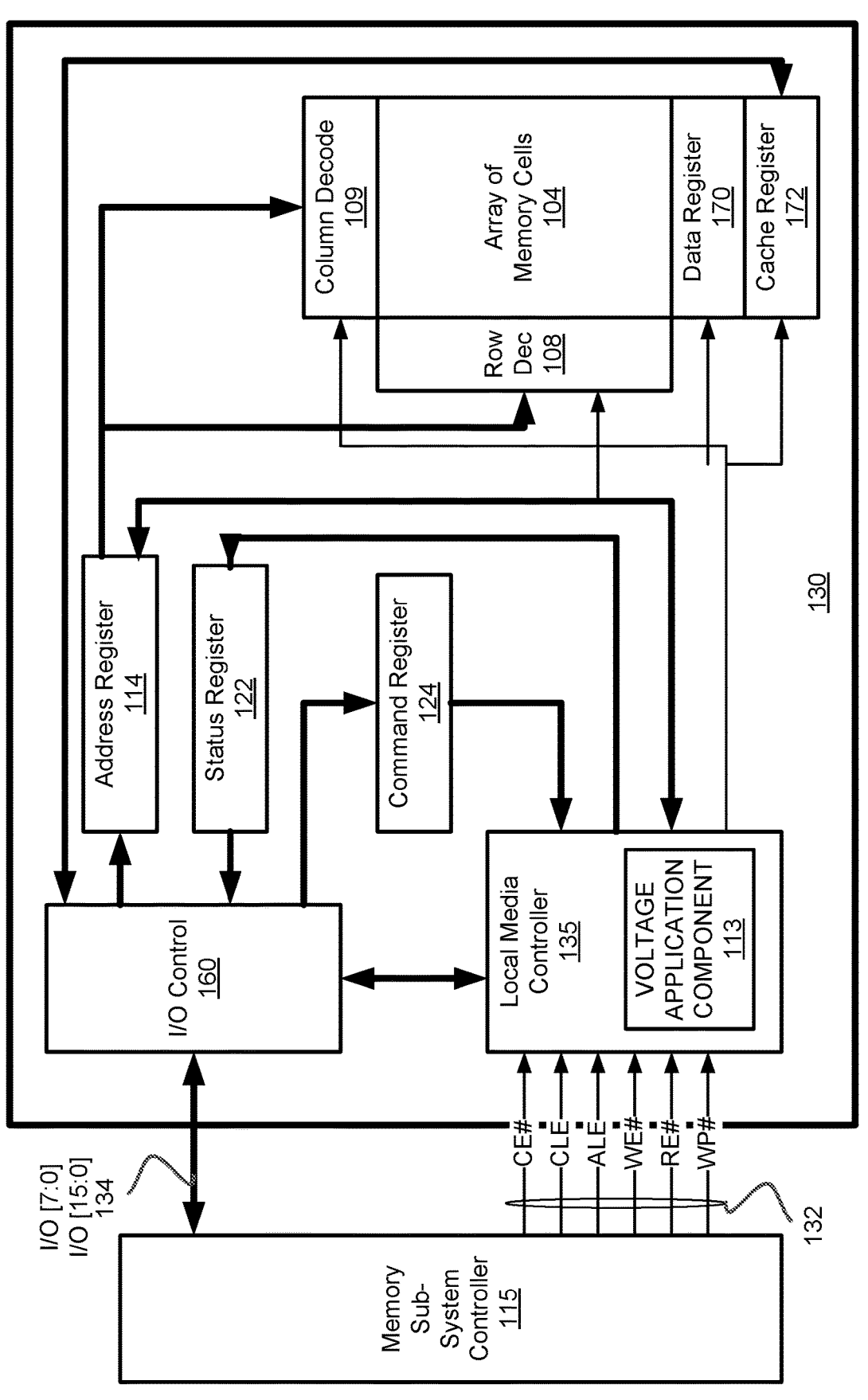
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device. The local media controller 135 can include voltage application component 113 as described with reference to FIG. 1B.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states. In one embodiment, the array of memory cells 104 (i.e., a "memory array") can include a number of sacrificial memory cells used to detect the occurrence of read disturb in memory device 130, as described in detail herein.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 236 and outputs data to the memory sub-system controller 115 over I/O bus 236.

For example, the commands may be received over input/output (I/O) pins [7:0] of I/O bus 236 at I/O control circuitry 160 and may then be written into command register 124. The addresses may be received over input/output (I/O) pins [7:0] of I/O bus 236 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
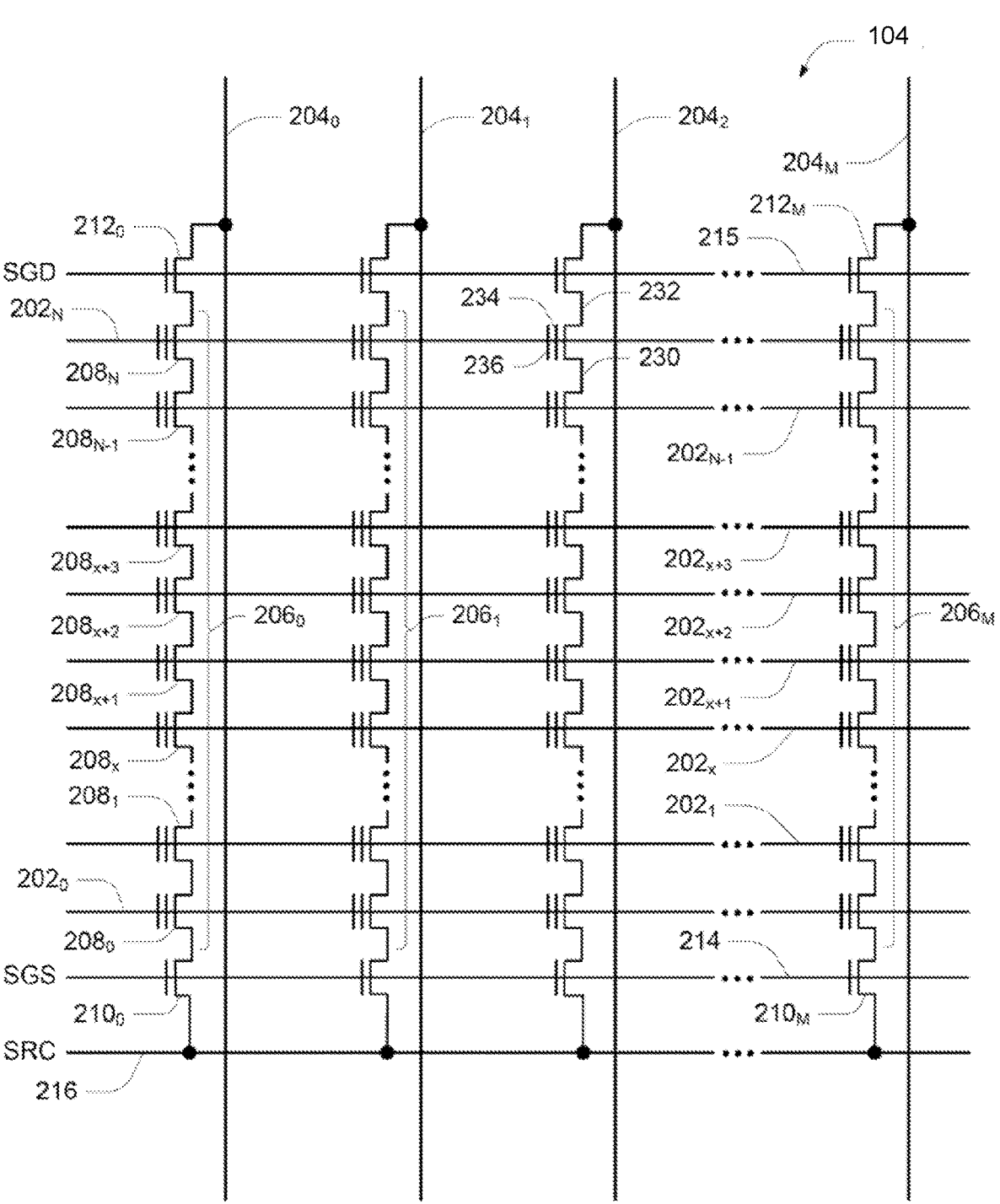
FIG. 2 is a schematic of portions of an array of memory cells as could be used in a memory of the type described with reference to FIG. 1B in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $202_0$ to $202_N$, and data lines, such as bit lines $204_0$ to $204_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells or replacement gate (RG) NAND memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $212_0$ can be connected to the bit line $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bit line 204. A control gate of each select gate 212 can be connected to select line 215.

In one embodiment, one or more of NAND strings 206 can be designated as sacrificial strings and used to detect read disturb in memory array 104. For example, NAND string $206_0$ can be designated a sacrificial string. In other embodiments, there can be different NAND strings or additional NAND strings, including two or more NAND strings, which are designated as sacrificial strings. In one embodiment, NAND string $206_0$ can include at least one sacrificial memory cell 208 from each wordline 202. These sacrificial memory cells 208 in the sacrificial memory string $206_0$ are not made available to the memory sub-system controller, and thus are not used to store host data. Rather, the sacrificial memory cells 208 remain in a default state (e.g., an erased state) or are programmed to a known voltage (e.g., a voltage corresponding to a known state). When a read operation is performed on any of the wordlines in memory array 104, a read voltage is applied to the selected wordline and a pass voltage is applied to the unselected wordlines, and the sacrificial memory cells will experience the same read disturb effects as the memory cells storing host data. When the read disturb effects become strong enough, one or more of the sacrificial memory cells can shift from the default or known state to a different state (e.g., to a state associated with a higher voltage level). Thus, local media controller 135 can perform a string sensing operation on the string of sacrificial memory cells to determine whether read disturb has occurred. In one embodiment, to perform the string sensing operation a predefined read voltage is applied to each wordline 202 concurrently, and the current through the sacrificial string $206_0$ is sensed. If any of the sacrificial memory cells 208 in the sacrificial string $206_0$ has shifted to a different state, the sacrificial string $206_0$ will not conduct and current will not flow. Thus, in such a situation, local media controller 135 can determine that read disturb is present in the block of memory array 104.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bit lines 204 (e.g., bit lines $204_0$, $204_2$, $204_4$, etc.) can be one physical page of the memory cells 208 (e.g., even memory cells) while memory cells 208 commonly connected to wordline $202_N$ and selectively connected to odd bit lines 204 (e.g., bit lines $204_1$, $204_3$, $204_5$, etc.) can be another physical page of the memory cells 208 (e.g., odd memory cells).

Although bit lines $204_3$-$204_5$ are not explicitly depicted in FIG. 2, it is apparent from the figure that the bit lines 204 of the array of memory cells 104 can be numbered consecutively from bit line $204_0$ to bit line $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 3:
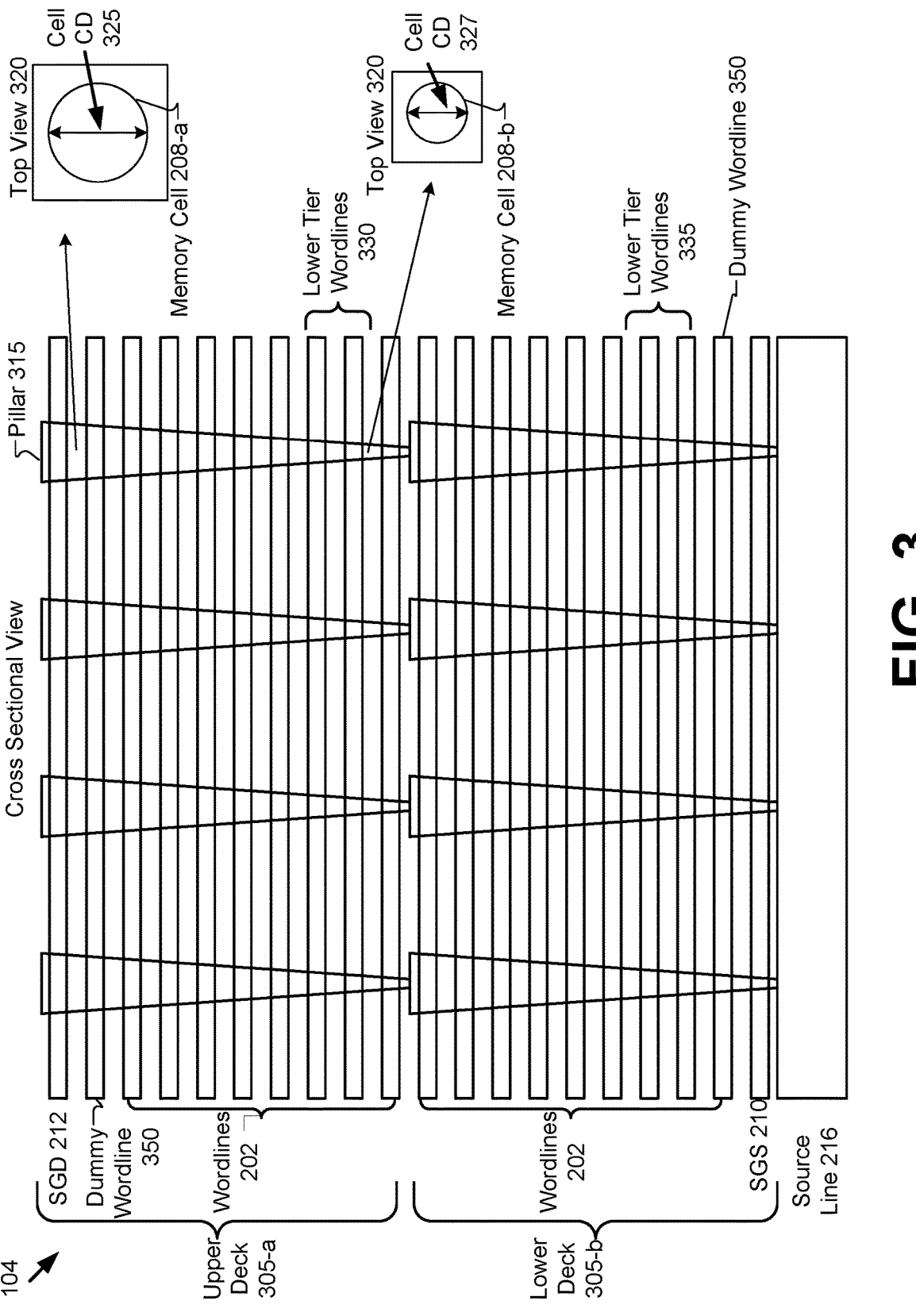
FIG. 3 is an illustration of an array of memory cells as could be used in a memory of the type described with reference to FIG. 1B in accordance with some embodiments of the present disclosure.

FIG. 3 is a schematic of portions of an array of memory cells 104, such as a NAND memory array, as could be used in a memory of the type described with reference to FIG. 1B according to an embodiment. Memory array 104 includes an upper deck 305-a including wordlines 202 as described with reference to FIG. 2 and a lower deck 305-b including wordlines 202 as described with reference to FIG. 2. In at least one embodiment, a deck 305 (e.g., a layer) can refer to a layer of memory cells or an array of memory cells 104. In such embodiments, array or layers of memory cells can be stacked on top of one another to form a three-dimensional array—e.g., multiple decks 305 can be stacked on top of one another to form the three-dimensional. Accordingly, upper deck 305-a can include wordlines 202 associated with a first deck that is stacked on top of a second deck (e.g., a lower deck 305-b) of wordlines 202. The upper or lower deck 305 can be an example of the array of memory cells 104 described with reference to FIG. 2. FIG. 3 can further illustrate a select gate drain (SGD) 212, select gate source (SGS) 210, and source line 216 as described with reference to FIG. 2. FIG. 3 illustrates a cross sectional view of wordlines and pillars 315 (e.g., a vertical conductive trace) extending from a shared bit line—e.g., each pillar 315 can represent a vertical NAND string 206 as described with reference to FIG. 2. Accordingly, each pillar 315 can include a memory cell 208 at an intersection with a wordline 202 or dummy wordline 350.

In at least one embodiment, each deck 305 can include memory cells 208 having varying dimensions. For example, pillar 315 can be formed in cone like shape, where the pillar 315 is wider towards the top and narrower towards the bottom—e.g., the pillar 315 width can decrease as the pillar 315 descends vertically down the deck 305. The varying pillar 315 width can cause memory cells 208 towards the top of the pillar (e.g., towards the top of the pillar 315 in a vertical direction) to have a larger cell critical dimension (CD) 325 than memory cells 208 towards the bottom of the pillar 315 (e.g., towards the bottom of the pillar 315 in the vertical direction). In one embodiment, top view 320 illustrates a memory cell 208-a having a cell CD 325 larger than a memory cell 208-b lower in the pillar 315 having a cell CD 327—e.g., the memory cell 208-a is wider and larger than memory cell 208-b. Accordingly, memory cell 208-b can have different dielectric characteristics and different read disturb or read window budget (RWB) properties compared with memory cell 208-a.

Figure 6:
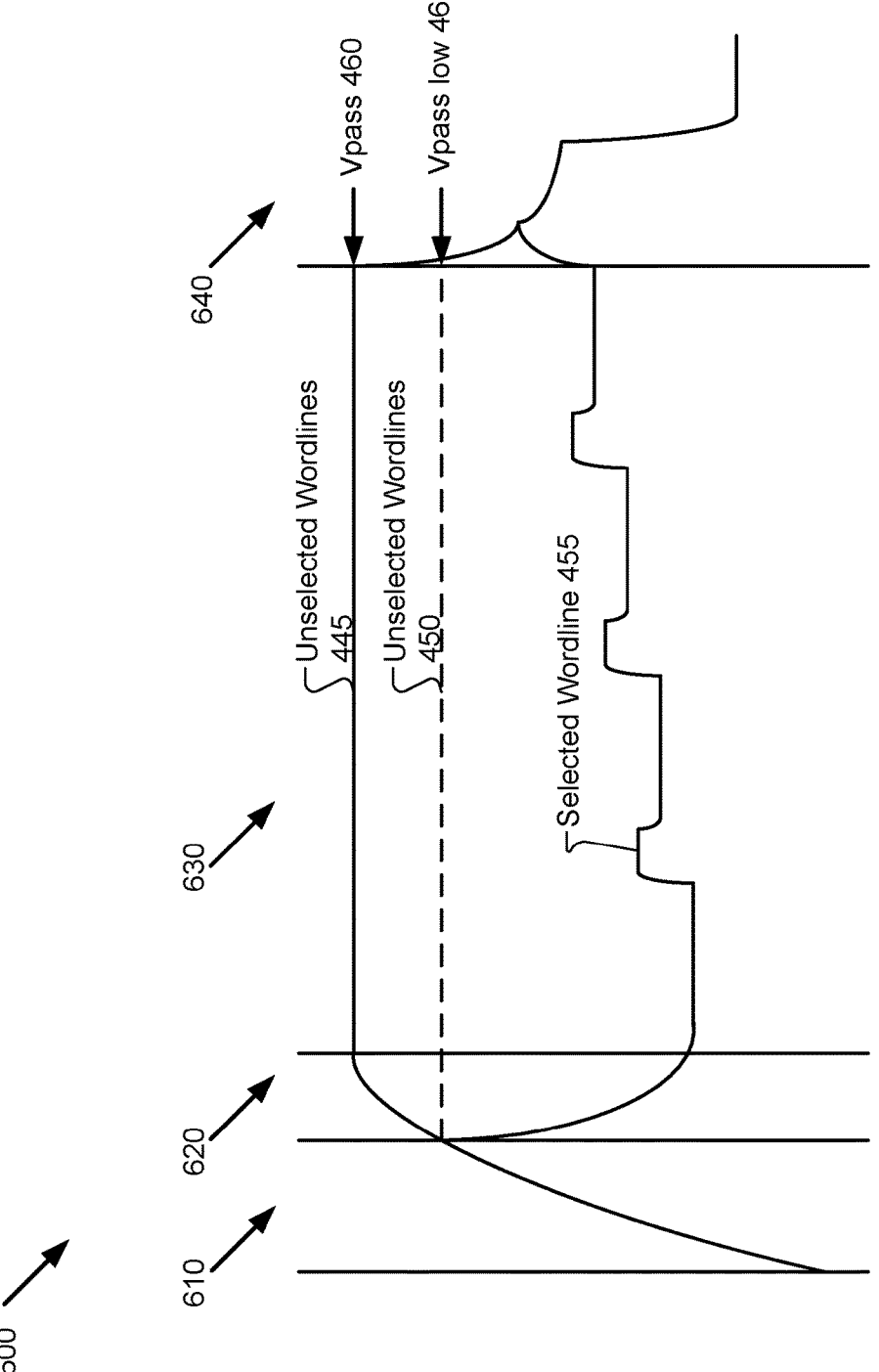
FIG. 6 is a timing diagram for operation of a memory device during a read operation utilizing a low pass through voltage, in accordance with embodiments of the present disclosure.

In at least one embodiment, a processing device can segment the wordlines 202 into different groups based on cell characteristics—e.g., based on cell CD, read disturb, or read window budget (RWB) properties. In some embodiments, the cell characteristics can be determined during a test operation or a manufacturing process. For example, the memory array 104 can undergo a test operation and a processing device can determine memory cells 208 coupled with lower tier wordlines 330 have a cell characteristic below a threshold value. In one embodiment, the processing device can determine cell CD 327 is below a threshold CD value or a read disturb value of memory cell 208-b satisfies a threshold value—e.g., a threshold value that mitigates read disturb effects or errors during read operation. Accordingly, the lower tier wordlines 330 can be grouped together, while the remaining wordlines 202 in the upper deck 305-a can be a separate group. Although two groups are illustrated, there can be any number of wordline groups—e.g., the processing device could segment each wordline into a separate group if necessary. In at least one embodiment, the processing device can utilize a different pass through voltage (Vpass) for each group of the segmented wordline 202. For example, the processing device can utilize a smaller pass through voltage for lower tier wordlines 330 during a read operation. In at least one embodiment, the processing device can bias the lower tier wordlines 330 to a lower pass through voltage during a read operation when the lower tier wordlines 330 are unselected. FIGS. 4-6 illustrate examples of biasing the lower tier wordlines 330 to a lower pass through voltage during a read operation.

In some embodiments, the processing device can segment wordlines 202 for each deck 305. For example, the processing device can segment the lower tier wordlines 335 of lower deck 305-b into a group. In some embodiments, the processing device can segment all lower tier wordlines 202 of a respective deck 305 into a group. In other embodiments, the location of the segmented wordlines 202 can be different—e.g., the processing device can segment the wordlines 202 into any number of groups based on cell characteristics or wordline 202 characteristics.

In at least one embodiment, each deck 305 can include one or more dummy wordlines 350—e.g., wordlines coupled with memory cells storing invalid data or data not associated with a host system. In at least one embodiment, the dummy wordline(s) 350 can be biased with a different pass through voltage. In at least one embodiment, dummy wordlines 350 illustrated in memory array 104 can be edge dummy wordlines 350—e.g., on the edge of each respective deck 305.

FIG. 4 is a timing diagram 400 for a low pass through voltage on lower tier wordlines for read disturb improvement, in accordance with some embodiments of the present disclosure. In at least one embodiment, the operations of timing diagram 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the operations of timing diagram 400 are performed by memory sub-system controller 115 or voltage application component 113 of FIG. 1A and FIG. 1B. During a read operation performed on a non-volatile memory device, such as memory device 130, certain voltages can be applied to wordlines and the channel. FIG. 4 illustrates a voltage across the unselected wordlines (e.g., the voltage at unselected wordlines 445 and 450) and a voltage across the selected wordlines 455 during the read operation. In at least one embodiment, unselected wordlines 445 and 450 can be coupled with memory cells not selected for the read operation. In at least one embodiment, unselected wordlines 450 can refer to lower tier wordlines 330 or lower tier wordlines 335 while unselected wordlines 445 can refer to the remaining wordlines 202 in the deck 305 as described with reference to FIG. 3. In this embodiment, the read operation includes four (4) time intervals (e.g. time interval 410, time interval 420, time interval 430, and time interval 440). It should be noted, each time interval is an example and is not limiting on the claims. That is, each time interval can be longer or faster than illustrated in FIG. 4 in some embodiments. Other time intervals are possible.

During time interval 410, voltage application component 113 can cause a bias to be applied to the unselected wordlines 445, unselected wordlines 450, and selected wordlines 455. In at least one embodiment, the voltage application component 113 is configured to cause a first voltage to be applied to unselected wordlines 445. In one example, the first voltage is pass through voltage (VPass) 460. In at least one embodiment, the voltage application component 113 is configured to cause the first voltage to be applied to the unselected wordlines 445 via a first voltage source. In some embodiments, the voltage application component 113 is configured to cause a second voltage to be applied to unselected wordlines 450. In at least one embodiment, the second voltage is pass through voltage (Vpass low) 465. In some embodiments, the voltage application component 113 can cause the second voltage to be applied via a second voltage source. In at least one embodiment, the second voltage source is dedicated to the unselected wordlines 450—e.g., dedicated to the lower tier wordlines 330. In some embodiments, the second voltage source is configured to bias upper and lower edge dummy wordlines 350 as described with reference to FIG. 3. Accordingly, in some embodiments, the voltage application component 113 can apply the same bias to the unselected wordlines 450 and dummy wordlines 350—e.g., a Vpass edge voltage. In a least one embodiment, the voltage application component 113 is also configured to bias the select gate drain (SGD) 212 and select gate source (SGS) 210 to activate the SGD 212 and SGS 210 respectively.

During time interval 420, the voltage application component 113 can determine the unselected wordlines 450 are biased to the second voltage (e.g., Vpass low 465). In at least one embodiment, the voltage application component can continue causing the first voltage to be applied to the unselected wordlines—e.g., continue causing the first voltage to be applied to the unselected wordlines since they are not biased to the first voltage. In at least one embodiment, the voltage application component 113 can initiate the read operation when the selected wordlines 455 are biased to the second voltage—e.g., Vpass low 465 can still exceed all threshold voltages of memory cells coupled with the selected wordline 455. In at least one embodiment, the voltage application component 113 can selectively discharge the selected wordline 455 during the time interval 420. In at least one embodiment, the voltage application component 113 can discharge the selected wordlines 455 to a first read voltage (e.g., a first read threshold voltage).

During time interval 430, the voltage application component 113 can determine the unselected wordlines 445 are biased to the first voltage—e.g., biased to Vpass 460. In at least one embodiment, the voltage application component 113 can refrain from applying or discharge a voltage at the unselected SGS 210 and SGD 212—e.g., the voltage application component 113 can turn off the unselected SGS 210 and SGD 212 to maintain the unselected wordlines 445 at the first voltage and the unselected wordlines 450 at the second voltage. In at least one embodiment, the voltage application component can perform the read operation during the time interval 430. For example, the voltage application component 113 can cause the selected wordlines 455 to be biased to the first read threshold voltage and perform a first read. The voltage application component 113 can then cause the selected wordlines 455 to be biased to a second read threshold voltage and perform a second read, and so on until all read threshold voltages are applied to the selected wordlines 455—e.g., all possible read threshold of a memory cell are applied to the selected wordlines. In at least one embodiment, a number of read threshold voltages applied to the selected wordline 455 can depend on a number of bits stored by a memory cell. In one example, four (4) read thresholds can be applied to a multi-bit cell and eight (8) read threshold voltages can be applied for a triple level cell (TLC), and so forth. In one embodiment, a read threshold voltage during a page read can depend on a page type. For example, for a multi-level cell (MLC) a lower page read can use one read threshold voltage and an upper page read can use two read threshold voltages. In one embodiment, for TLC memory, the read threshold voltage can be dependent on a gray code of the system—e.g., a lower page can use two (2) read threshold voltages, an upper page read can use three (3) read threshold voltages, and an extra page can use two (2) read threshold voltages.

During time interval 440, the voltage application component 113 can discharge the unselected wordlines 445 and unselected wordlines 450. In at least one embodiment, the voltage application component 113 can also discharge the selected wordline 455 and turn off the selected SGS 210 and SGD 212. In some embodiments, the memory device can determine a state or logic state of a memory cell after the time interval 440.

In at least one embodiment, Tables 1 and 2 illustrate possible voltages applied to each of the wordlines 202 as illustrated in FIG. 4.

TABLE 1

|  | Layer | Bias |
|---|---|---|
| Upper Deck | Dummy WL | vpass_edge |
|  | Upper Tier WLs | vpass |
|  | Lower Tier WLs | vpass_low |
|  | DummyWL | vpass_high |
| Lower Deck | Dummy WL | vpass_high |
|  | Upper Tier WLs | vpass |
|  | Lower Tier WLs | vpass_low |
|  | Dummy WL | vpass_edge |
| Drain side neighbor | WLn-1 (Selected Wordline minus one) | vpass_high |
| Selected | WLn | Read Voltage |
| Source side neighbor | WLn + 1 (Selected Wordline plus one) | vpass_high |

TABLE 2

|  | Layer | Bias |
|---|---|---|
| Upper Deck | Dummy WL | vpass_edge |
|  | Upper Tier WLs | vpass |
|  | Lower Tier WLs | vpass_edge |
|  | Dummy WL | vpass_high |
| Lower Deck | Dummy WL | vpass_high |
|  | Upper Tier WLs | vpass |
|  | Lower Tier WLs | vpass_edge |
|  | Dummy WL | vpass_edge |

TABLE 2-continued

| | Layer | Bias |
|---|---|---|
| Drain side neighbor | WLn-1 | vpass_high |
| Selected | WLn | vread |
| Source side neighbor | WLn + 1 | vpass_high |

Table 1 illustrates one embodiment where the lower tier wordlines have a dedicated pass through voltage source. Table 2 illustrates one embodiment where the lower tier wordlines share a pass through voltage with dummy wordlines at the edge—e.g., dummy wordlines 350 as described with reference to FIG. 3.

FIG. 5 is a timing diagram 500 for a low pass through voltage on lower tier wordlines for read disturb improvement, in accordance with some embodiments of the present disclosure. In at least one embodiment, the operations of timing diagram 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the operations of timing diagram 500 are performed by memory sub-system controller 115 or voltage application component 113 of FIG. 1A and FIG. 1B. During a read operation performed on a non-volatile memory device, such as memory device 130, certain voltages can be applied to wordlines and the channel. FIG. 5 illustrates a voltage across the unselected wordlines (e.g., the voltage at unselected wordlines 445 and 450 as described with reference to FIG. 4) and a voltage across the selected wordlines 455 during the read operation. In at least one embodiment, unselected wordlines 445 and 450 can be coupled with memory cells not selected for the read operation. In at least one embodiment, unselected wordlines 450 can refer to lower tier wordlines 330 or lower tier wordlines 335 while unselected wordlines 445 can refer to the remaining wordlines 202 in the deck 305 as described with reference to FIG. 3. In this embodiment, the read operation includes four (4) time intervals (e.g. time interval 510, time interval 520, time interval 530, and time interval 540). It should be noted, each time interval is an example and is not limiting on the claims. That is, each time interval can be longer or faster than illustrated in FIG. 5 in some embodiments. Other time intervals are possible.

During time interval 510, voltage application component 113 can cause a bias to be applied to the unselected wordlines 445, unselected wordlines 450, and selected wordlines 455. In at least one embodiment, the voltage application component 113 is configured to cause a first voltage to be applied to unselected wordlines 445. In one example, the first voltage is pass through voltage (VPass) 460. In at least one embodiment, the voltage application component 113 is configured to cause the first voltage to be applied to the unselected wordlines 445 via a first voltage source. In some embodiments, the voltage application component 113 is configured to cause the first voltage to be applied to unselected wordlines 450—e.g., the voltage application component 113 can cause the first voltage source to apply the first voltage to both the unselected wordlines 445 and the unselected wordlines 450. In a least one embodiment, the voltage application component 113 is also configured to bias the select gate drain (SGD) 212 and select gate source (SGS) 210 to activate the SGD 212 and SGS 210 respectively.

During time interval 520, the voltage application component 113 the voltage application component 113 can selectively discharge the selected wordline 455 during the time interval 520 to initiate the read operation. For example, the voltage application component 113 can discharge the selected wordlines 455 to a first read voltage (e.g., a first read threshold voltage).

During time interval 530, the voltage application component 113 can determine the unselected wordlines 445 and unselected wordlines 450 are biased to the first voltage—e.g., biased to Vpass 460. In at least one embodiment, the voltage application component 113 can refrain from applying or discharge a voltage at the unselected SGS 210 and SGD 212—e.g., the voltage application component 113 can turn off the unselected SGS 210 and SGD 212 to maintain the unselected wordlines 445 at the first voltage. In at least one embodiment, the voltage application component 113 can selectively discharge the unselected wordlines 450 after determining they are biased to the first voltage. In at least one embodiment, the voltage application component 113 can discharge the unselected wordlines 450 until they are biased to a second voltage—e.g., biased to Vpass low 465. Accordingly, the voltage application component 113 can utilize one voltage source to bias all the unselected wordlines to the first voltage and then discharge the unselected wordlines 450 to the second voltage. In this embodiment, the voltage application component 113 can refrain from using multiple voltage sources to bias the various groups of unselected wordlines.

In at least one embodiment, the voltage application component can perform the read operation during the time interval 530 as described with reference to FIG. 4. For example, the voltage application component 113 can cause the selected wordlines 455 to be biased to the first read threshold voltage and perform a first read. The voltage application component 113 can then cause the selected wordlines 455 to be biased to a second read threshold voltage and perform a second read, and so on until all read threshold voltages are applied to the selected wordlines 455—e.g., all possible read threshold of a memory cell are applied to the selected wordlines. In at least one embodiment, a number of read threshold voltages applied to the selected wordline 455 can depend on a number of bits stored by a memory cell. In one example, four (4) read thresholds can be applied to a multi-bit cell and eight (8) read threshold voltages can be applied for a triple level cell (TLC), and so forth. In one embodiment, a read threshold voltage during a page read can depend on a page type. For example, for a multi-level cell (MLC) a lower page read can use one read threshold voltage and an upper page read can use two read threshold voltages. In one embodiment, for TLC memory, the read threshold voltage can be dependent on a gray code of the system—e.g., a lower page can use two (2) read threshold voltages, an upper page read can use three (3) read threshold voltages, and an extra page can use two (2) read threshold voltages.

During time interval 540, the voltage application component 113 can discharge the unselected wordlines 445 and unselected wordlines 450. In at least one embodiment, the voltage application component 113 can also discharge the selected wordline 455 and turn off the selected SGS 210 and SGD 212. In some embodiments, the memory device can determine a state or logic state of a memory cell after the time interval 540.

FIG. 6 is a timing diagram 600 for a low pass through voltage on lower tier wordlines for read disturb improvement, in accordance with some embodiments of the present disclosure. In at least one embodiment, the operations of timing diagram 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the operations of timing diagram 600 are performed by memory sub-system controller 115 or voltage application component 113 of FIG. 1A and FIG. 1B. During a read operation performed on a non-volatile memory device, such as memory device 130, certain voltages can be applied to wordlines and the channel. FIG. 6 illustrates a voltage across the unselected wordlines (e.g., the voltage at unselected wordlines 445 and 450 as described with reference to FIG. 4) and a voltage across the selected wordlines 455 during the read operation. In at least one embodiment, unselected wordlines 445 and 450 can be coupled with memory cells not selected for the read operation. In at least one embodiment, unselected wordlines 450 can refer to lower tier wordlines 330 or lower tier wordlines 335 while unselected wordlines 445 can refer to the remaining wordlines 202 in the deck 305 as described with reference to FIG. 3. In this embodiment, the read operation includes four (4) time intervals (e.g. time interval 610, time interval 620, time interval 630, and time interval 640). It should be noted, each time interval is an example and is not limiting on the claims. That is, each time interval can be longer or faster than illustrated in FIG. 6 in some embodiments. Other time intervals are possible.

During time interval 610, voltage application component 113 can cause a bias to be applied to the unselected wordlines 445, unselected wordlines 450, and selected wordlines 455. In at least one embodiment, the voltage application component 113 is configured to cause a first voltage to be applied to unselected wordlines 445. In one example, the first voltage is pass through voltage (VPass) 460. In at least one embodiment, the voltage application component 113 is configured to cause the first voltage to be applied to the unselected wordlines 445 via a first voltage source. In some embodiments, the voltage application component 113 is configured to cause the first voltage to be applied to unselected wordlines 450—e.g., the voltage application component 113 can cause the first voltage source to apply the first voltage to both the unselected wordlines 445 and the unselected wordlines 450. In a least one embodiment, the voltage application component 113 is also configured to bias the select gate drain (SGD) 212 and select gate source (SGS) 210 to activate the SGD 212 and SGS 210 respectively.

During time interval 620, the voltage application component 113 can determine the unselected wordlines 450 are biased to a second voltage (e.g., biased to Vpass low 465). In at least one embodiment, the voltage application component 113 can isolate the unselected wordlines 450 from the first voltage source after determining the unselected wordlines 450 are biased to Vpass low 465. In at least one embodiment, the voltage application component can turn off the unselected SGS 210 and SGD 212 coupled with the unselected wordlines 450. By isolating the unselected wordlines 450 from the first voltage source, the voltage application component 113 can place the unselected wordlines 450 in a floating state. In at least one embodiment, the voltage application component 113 can selectively discharge the selected wordline 455 during the time interval 520 to initiate the read operation. For example, the voltage application component 113 can discharge the selected wordlines 455 to a first read voltage (e.g., a first read threshold voltage).

During time interval 630, the voltage application component 113 can determine the unselected wordlines 445 are biased to the first voltage—e.g., biased to Vpass 460. In at least one embodiment, the voltage application component 113 can refrain from applying or discharge a voltage at the unselected SGS 210 and SGD 212—e.g., the voltage application component 113 can turn off the unselected SGS 210 and SGD 212 to maintain the unselected wordlines 445 at the first voltage and the unselected wordlines 450 at the second voltage. In at least one embodiment, the voltage application component can perform the read operation during the time interval 630. For example, the voltage application component 113 can cause the selected wordlines 455 to be biased to the first read threshold voltage and perform a first read. The voltage application component 113 can then cause the selected wordlines 455 to be biased to a second read threshold voltage and perform a second read, and so on until all read threshold voltages are applied to the selected wordlines 455—e.g., all possible read threshold of a memory cell are applied to the selected wordlines. In at least one embodiment, a number of read threshold voltages applied to the selected wordline 455 can depend on a number of bits stored by a memory cell. In one example, four (4) read thresholds can be applied to a multi-bit cell and eight (8) read threshold voltages can be applied for a triple level cell (TLC), and so forth. In one embodiment, a read threshold voltage during a page read can depend on a page type. For example, for a multi-level cell (MLC) a lower page read can use one read threshold voltage and an upper page read can use two read threshold voltages. In one embodiment, for TLC memory, the read threshold voltage can be dependent on a gray code of the system—e.g., a lower page can use two (2) read threshold voltages, an upper page read can use three (3) read threshold voltages, and an extra page can use two (2) read threshold voltages.

During time interval 640, the voltage application component 113 can discharge the unselected wordlines 445 and unselected wordlines 450. In at least one embodiment, the voltage application component 113 can also discharge the selected wordline 455 and turn off the selected SGS 210 and SGD 212. In some embodiments, the memory device can determine a state or logic state of a memory cell after the time interval 640.

FIG. 7 is a flow diagram of an example method for a low pass through voltage on lower tier wordlines in a memory device, in accordance with some embodiments of the present disclosure. The method 700 can be performed by control logic or processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by local media controller 135 or voltage application component 113 of FIG. 1A and FIG. 1B. For example, in at least one embodiment, the method 700 is performed by the memory sub-system controller 115 on the memory device 130—e.g., the voltage application component 113 can initiate operations on memory cells of memory array 104 of memory device 130 as described with reference to FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, a read operation is initiated on one or more memory cells of a plurality of memory cells. For example, the processing logic (e.g., voltage application component 113) causes a read operation to be initiated on the one or more memory cells. In at least one embodiment, the plurality of memory cells are arranged in one or more tiers as described with reference to FIG. 3. In at least one embodiment, the memory device includes a plurality of decks, each deck comprising the plurality of memory cells arranged in one or more tiers—e.g., the memory device can include decks 305 as described with reference to FIG. 2.

At operation 710, a read voltage is applied to a selected wordline coupled to the one or more memory cells. For example, the processing logic causes the read voltage to be applied to the selected wordline—e.g., the wordline coupled to the one or more memory cells selected for the read operation. In at least one embodiment, the read voltage is an example of a read threshold voltage applied during the time interval 430 as described with reference to FIG. 4.

At operation 715, a first pass through voltage is applied to a first set of unselected wordlines coupled to memory cells in a first tier of the one or more tiers during the read operation. For example, the processing logic can cause the first pass through voltage to be applied to the first set of unselected wordlines. In at least one embodiment, the first set of unselected wordlines can be all wordlines 202 in deck 305-a except for lower tier wordlines 330 as described with reference to FIG. 3. For example, the wordlines 202 above the lower tier wordlines 330 can collectively be referred to as the first set of unselected wordlines. In at least one embodiment, the first pass through voltage can be Vpass 460 as described with reference to FIG. 4. In at least one embodiment, the processing logic can cause the first pass through voltage to be applied via a first voltage source.

At operation 720, a second pass through voltage is applied to a second set of unselected wordlines coupled to memory cells in a second tier of the one or more tiers during the read operation. For example, the processing logic can cause the second pass through voltage to be applied to the second set of wordlines during the read operation, where the second pass through voltage is less than the first pass through voltage. In at least one embodiment, the second set of unselected wordlines can be lower tier wordlines 330 or lower tier wordlines 335 as described with reference to FIG. 3. In some embodiments, the second pass through voltage can be Vpass low (e.g., Vpass low 465 as described with reference to FIG. 4). In at least one embodiment, the processing logic can cause the second pass through voltage to be applied via a second voltage source. In other embodiments, the processing logic can cause the second pass through voltage to be applied via a voltage source configured to bias dummy wordlines—e.g., bias dummy wordlines 350 as described with reference to FIGS. 3 and 4. In such embodiments, the processing logic can cause the second pass through voltage to be applied to the one or more dummy wordlines coupled to memory cells storing invalid data. In at least one embodiment, the first set of unselected wordlines are positioned above the second set of unselected wordlines in a vertical direction—e.g., the second set of wordlines (e.g., lower tier wordlines 330) as positioned below the remaining wordlines in deck 305-a.

In some embodiments, the memory cells coupled to the first set of unselected wordlines have a first critical dimension and the memory cells coupled to the second set of unselected wordlines have a second critical dimension less than the first critical dimension—e.g., memory cell 208-a has a cell critical dimension larger than memory cell 208-b as described with reference to FIG. 4. In at least one embodiment, the first set of unselected wordlines have a first read disturb margin and the second set of unselected wordlines have a second read disturb margin. In some embodiments, the processing logic can determine the first set of unselected wordlines and second set of unselected wordlines based at least in part on a cell characteristic of memory cells of the first tier and memory cells of the second tier—e.g., the processing device can perform a test operation or store data from a manufacturing process that indicates cell characteristics. In some embodiments, the processing logic can determine a cell critical dimension of a memory cell coupled with the second set of unselected wordlines fails to satisfy a threshold value—e.g., a cell critical dimension of the memory cell is less than a threshold cell critical dimension. That is, the processing logic can group the memory cell with the second set of unselected wordlines based on the cell critical dimension failing to satisfy the threshold value.

In at least one embodiment, the processing logic can perform a second read operation on a second deck. For example, processing logic can initiate a second read operation at a second deck of the memory device. The processing logic can cause a read voltage to be applied to a second selected wordline of the second deck during the read operation. The processing logic can further cause the first pass through voltage to be applied to a third set of unselected wordlines coupled to memory cells in a third tier of the second deck during the read operation. In at least one embodiment, the processing logic can cause the second pass through voltage to be applied to a fourth set of unselected wordlines coupled to memory cells in a fourth tier of the second deck during the read operation, wherein the second pass through voltage is less than the first pass through voltage, and wherein the third set of unselected wordlines are positioned above the fourth set of unselected wordlines in a vertical direction.

FIG. 8 is a flow diagram of an example method for a low pass through voltage on lower tier wordlines in a memory device, in accordance with some embodiments of the present disclosure. The method 800 can be performed by control logic or processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by local media controller 135 or voltage application component 113 of FIG. 1A and FIG. 1B. For example, in at least one embodiment, the method 800 is performed by the memory sub-system controller 115 on the memory device 130—e.g., the voltage application component 113 can initiate operations on memory cells of memory array 104 of memory device 130 as described with reference to FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 805, a read operation is initiated on one or more memory cells of a plurality of memory cells. For example, the processing logic (e.g., voltage application component 113) causes a read operation to be initiated on the one or more memory cells. In at least one embodiment, the plurality of memory cells are arranged in one or more tiers as described with reference to FIG. 3. In at least one embodiment, the memory device includes a plurality of decks, each deck comprising the plurality of memory cells arranged in one or more tiers—e.g., the memory device can include decks 305 as described with reference to FIG. 2.

At operation 810, a read voltage is applied to a selected wordline coupled to the one or more memory cells. For example, the processing logic causes the read voltage to be applied to the selected wordline—e.g., the wordline coupled to the one or more memory cells selected for the read operation. In at least one embodiment, the read voltage is an example of a read threshold voltage applied during the time interval 430 as described with reference to FIG. 4.

At operation 815, a first pass through voltage is applied to a first set of unselected wordlines coupled to memory cells in a first tier of the one or more tiers during the read operation. For example, the processing logic can cause the first pass through voltage to be applied to the first set of unselected wordlines. In at least one embodiment, the first set of unselected wordlines can be all wordlines 202 in deck 305-*a* except for lower tier wordlines 330 as described with reference to FIG. 3. For example, the wordlines 202 above the lower tier wordlines 330 can collectively be referred to as the first set of unselected wordlines. In at least one embodiment, the first pass through voltage can be Vpass 460 as described with reference to FIG. 4.

At operation 820, a second set of wordlines are biased to a second pass through voltage during the read operation. For example, the processing logic can cause the second set of unselected wordlines coupled to memory cells in a second tier of the one or more tiers to be biased to the second pass through voltage during the read operation, where the second pass through voltage is less than the first pass through voltage. In at least one embodiment, the second set of unselected wordlines can be lower tier wordlines 330 or lower tier wordlines 335 as described with reference to FIG. 3. In some embodiments, the second pass through voltage can be Vpass low (e.g., Vpass low 465 as described with reference to FIG. 4).

In at least one embodiment, to cause the second set of wordlines to be biased to the second pass through voltage, the processing logic is to cause the first pass through voltage to be applied to the second set of unselected wordlines coupled to memory cells in the second tier—e.g., cause the first voltage source to apply the first pass through voltage to all wordlines as described with reference to FIG. 5. In at least one embodiment, the processing logic can then determine the second set of unselected wordlines are biased to the first pass through voltage. In such embodiments, the processing logic can selectively discharge the second set of unselected wordlines to cause the second set of wordlines to be biased at the pass through second voltage—e.g., processing logic can discharge unselected wordlines 450 from the Vpass 460 to Vpass low 465 as described with reference to FIG. 5.

In at least some embodiments, to cause the second set of wordlines to be biased to the second pass through voltage, the processing logic is to cause the first pass through voltage to be applied to the second set of unselected wordlines coupled to memory cells in the second tier—e.g., cause the first voltage source to apply the first pass through voltage to all wordlines as described with reference to FIG. 6. In at least one embodiment, the processing logic can then determine the second set of unselected wordlines are biased to a second pass through voltage—e.g., biased to Vpass low 465 as described with reference to FIG. 6. In such embodiments, the processing logic can isolate the second set of unselected wordlines from a voltage source generating the first pass through voltage—e.g., isolate the second set of unselected wordlines from all voltage sources and place them in a floating state. In some embodiments, the processing logic can cause the first pass through voltage to be applied to the first set of unselected wordlines coupled to memory cells in the second tier after isolating the second set of unselected wordlines from the voltage source—e.g., the processing logic can continue biasing the first set of unselected wordlines until they reach the first pass through voltage as described with reference to FIG. 6. In such embodiments, the processing logic can determine the first set of unselected wordlines are at the first pass through voltage and refrain from causing the first pass through voltage to be applied to the first set of unselected wordlines after determining the first set of unselected wordlines are at the first pass through voltage.

In at least one embodiment, the first set of unselected wordlines are positioned above the second set of unselected wordlines in a vertical direction—e.g., the second set of wordlines (e.g., lower tier wordlines 330) as positioned below the remaining wordlines in deck 305-*a*. In some embodiments, the memory cells coupled to the first set of unselected wordlines have a first critical dimension and the memory cells coupled to the second set of unselected wordlines have a second critical dimension less than the first critical dimension—e.g., memory cell 208-*a* has a cell critical dimension larger than memory cell 208-*b* as described with reference to FIG. 4. In at least one embodiment, the first set of unselected wordlines have a first read disturb margin and the second set of unselected wordlines have a second read disturb margin. In some embodiments, the processing logic can determine the first set of unselected wordlines and second set of unselected wordlines based at least in part on a cell characteristic of memory cells of the first tier and memory cells of the second tier—e.g., the processing device can perform a test operation or store data from a manufacturing process that indicates cell characteristics. In some embodiments, the processing logic can determine a cell critical dimension of a memory cell coupled with the second set of unselected wordlines fails to satisfy a threshold value—e.g., a cell critical dimension of the memory cell is less than a threshold cell critical dimension. That is, the processing logic can group the memory cell with the second set of unselected wordlines based on the cell critical dimension failing to satisfy the threshold value.

Figure 9:
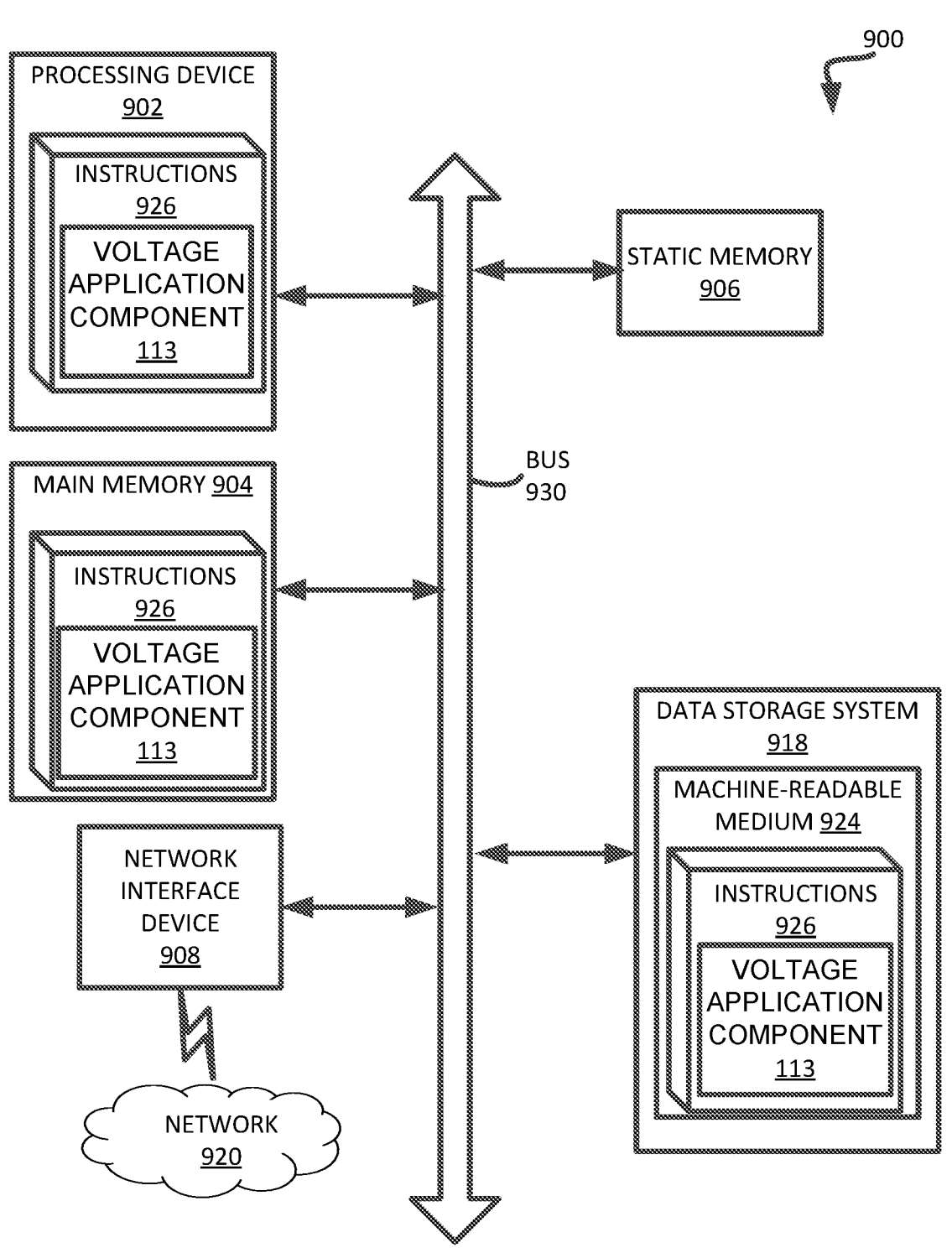
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the voltage application component 113 of FIG. 1 to perform a read operation). In at least one embodiment, the voltage application component 113 is configured to bias unselected wordline group during a read operation as described with reference to FIGS. 3-8. For example, the voltage application component 113 can bias a first set of unselected wordlines to a first pass through voltage and bias a second set of unselected wordlines to a second pass through voltage, where the second pass through voltage is less than the first pass through voltage. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or RDRAM, etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 404 can correspond to the memory sub-system 110 of FIG. 1.

In one embodiment, the instructions 926 include instructions to implement functionality corresponding to a voltage application component 113 to perform a read operation for the processing device 902. While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a memory array comprising a plurality of memory cells arranged in one or more tiers; and
control logic, operatively coupled with the memory array, wherein the control logic is configured to:
initiate a read operation on one or more memory cells of the plurality of memory cells;
cause a read voltage to be applied to a selected wordline coupled to the one or more memory cells during the read operation;
cause a first pass through voltage to be applied to a first set of unselected wordlines coupled to memory cells in a first tier of the one or more tiers during the read operation; and
cause a second pass through voltage to be applied to a second set of unselected wordlines coupled to memory cells in a second tier of the one or more tiers during the read operation, wherein the second pass through voltage is less than the first pass through voltage, and wherein the first set of unselected wordlines are positioned further away from a source end of the memory array than the second set of unselected wordlines in a vertical direction.

2. The memory device of claim 1, wherein the memory cells coupled to the first set of unselected wordlines have a first critical dimension and the memory cells coupled to the second set of unselected wordlines have a second critical dimension less than the first critical dimension.

3. The memory device of claim 1, wherein the memory array comprises a plurality of decks, each deck comprising the plurality of memory cells arranged in the one or more tiers.

4. The memory device of claim 1, wherein the control logic is further configured to:
initiate a second read operation at a second deck of the memory device;
cause a read voltage to be applied to a second selected wordline of the second deck during the read operation;
cause the first pass through voltage to be applied to a third set of unselected wordlines coupled to memory cells in a third tier of the second deck during the read operation; and
cause the second pass through voltage to be applied to a fourth set of unselected wordlines coupled to memory cells in a fourth tier of the second deck during the read operation, wherein the second pass through voltage is less than the first pass through voltage, and wherein the third set of unselected wordlines are positioned further away from the source end of the memory array than the fourth set of unselected wordlines in a vertical direction.

5. The memory device of claim 1, wherein the first set of unselected wordlines have a first read disturb margin and the second set of unselected wordlines have a second read disturb margin.

6. The memory device of claim 1, wherein the control logic is further configured to:
determine the first set of unselected wordlines and second set of unselected wordlines based at least in part on a cell characteristic of memory cells of the first tier and memory cells of the second tier.

7. The memory device of claim 1, wherein the control logic is further configured to:
cause the second pass through voltage to be applied to one or more dummy wordlines coupled to memory cells storing invalid data.

8. A memory device comprising:
a memory array comprising a plurality of memory cells arranged in one or more tiers; and
control logic, operatively coupled with the memory array, wherein the control logic is configured to:
initiate a read operation on one or more memory cells of the plurality of memory cells;
cause a read voltage to be applied to a selected wordline coupled to the one or more memory cells during the read operation;
cause a first pass through voltage to be applied to a first set of unselected wordlines coupled to memory cells in a first tier of the one or more tiers during the read operation; and
cause a second set of unselected wordlines coupled to memory cells in a second tier of the one or more tiers to be biased to a second pass through voltage during the read operation, wherein the second pass through voltage is less than the first pass through voltage, and wherein first set of unselected wordlines are positioned further away from a source end of the memory array than the second set of unselected wordlines in a vertical direction.

9. The memory device of claim 8, wherein to cause the second set of unselected wordlines to be biased to the second pass through voltage, the control logic is further configured to:
cause the first pass through voltage to be applied to the second set of unselected wordlines coupled to memory cells in the second tier;
determine the second set of unselected wordlines are at the first pass through voltage; and
selectively discharge the second set of unselected wordlines to cause the second set of unselected wordlines to be at the second pass through voltage.

10. The memory device of claim 8, wherein to cause the second set of unselected wordlines to be at the second pass through voltage, the control logic is further configured to:
cause the first pass through voltage to be applied to the second set of unselected wordlines coupled to memory cells in the second tier;
determine the second set of unselected wordlines are at the second pass through voltage; and
isolate the second set of unselected wordlines from a voltage source generating the first pass through voltage.

11. The memory device of claim 10, wherein the control logic is further configured to:
cause the first pass through voltage to be applied to the first set of unselected wordlines coupled to memory cells in the second tier after isolating the second set of unselected wordlines from the voltage source;

determine the first set of unselected wordlines are at the first pass through voltage; and refrain from causing the first pass through voltage to be applied to the first set of unselected wordlines after determining the first set of unselected wordlines are at the first pass through voltage.

12. The memory device of claim 8, wherein the memory cells coupled to the first set of unselected wordlines have a first critical dimension and the memory cells coupled to the second set of unselected wordlines have a second critical dimension less than the first critical dimension.

13. The memory device of claim 8, wherein the first set of unselected wordlines have a first read disturb margin and the second set of unselected wordlines have a second read disturb margin.

14. The memory device of claim 8, wherein the control logic is further configured to:

determine the first set of unselected wordlines and second set of unselected wordlines based at least in part on a cell characteristic of memory cells of the first tier and memory cells of the second tier.

15. A method comprising:

initiating a read operation on one or more memory cells of a plurality of memory cells in a memory array arranged in one or more tiers;

causing a read voltage to be applied to a selected wordline coupled to the one or more memory cells during the read operation;

causing a first pass through voltage to be applied to a first set of unselected wordlines coupled to memory cells in a first tier of the one or more tiers during the read operation; and causing a second pass through voltage to be applied to a second set of unselected wordlines coupled to memory cells in a second tier of the one or more tiers during the read operation, wherein the second pass through voltage is less than the first pass through voltage, and wherein first set of unselected wordlines are positioned further away from a source end of the memory array than the second set of unselected wordlines in a vertical direction.

16. The method of claim 15, wherein the memory cells coupled to the first set of unselected wordlines have a first critical dimension and the memory cells coupled to the second set of unselected wordlines have a second critical dimension less than the first critical dimension.

17. The method of claim 15, wherein the first set of unselected wordlines have a first read disturb margin and the second set of unselected wordlines have a second read disturb margin.

* * * * *